United States Patent
Gehring et al.

(10) Patent No.: US 6,364,753 B1
(45) Date of Patent: Apr. 2, 2002

(54) METHOD AND DEVICE FOR PRODUCING PINS, SUCH AS BATTERY TERMINALS

(75) Inventors: Manfred Gehring, Birkenfeld; Uwe Düppengiesser, Stolberg, both of (DE)

(73) Assignee: William Prym GmbH & Co. KG, Stolberg (DE)

( * ) Notice: Subject to any disclaimer, the term of this patent is extended or adjusted under 35 U.S.C. 154(b) by 0 days.

(21) Appl. No.: 09/485,765
(22) PCT Filed: Jul. 27, 1998
(86) PCT No.: PCT/EP98/04698
§ 371 Date: Feb. 20, 2001
§ 102(e) Date: Feb. 20, 2001
(87) PCT Pub. No.: WO99/08836
PCT Pub. Date: Feb. 25, 1999

(51) Int. Cl.$^7$ .................................. B24B 1/00
(52) U.S. Cl. .......................... 451/57; 451/65
(58) Field of Search .................. 451/58, 57, 65, 451/70, 71, 45, 48, 66

(56) References Cited

FOREIGN PATENT DOCUMENTS

| DE | 580938 | 7/1933 |
| EP | 0642887 | 3/1995 |
| FR | 2297052 | 8/1976 |

OTHER PUBLICATIONS

Patent Abstracts of Japan, vol. 017, No. 106 (M–1375), Mar. 3, 1993 & JP 04 296510 A (NGK Insulators Ltd), Oct. 20, 1992.

Primary Examiner—Timothy V. Eley
Assistant Examiner—Dung Van Nguyen
(74) Attorney, Agent, or Firm—Freidrich Kueffner

(57) ABSTRACT

The invention relates to a method for producing battery terminals comprising different steps, during which a continuous wire (18) is cut (22) into predefined lengths, and then a pin head and point are formed. To this end, a conveyor path (40) is used, at the end of which the pegs (10) fall into a receptacle. In order to accelerate and simplify finishing of the pointed pins (10"), the aftertreatment of the pin points takes place on the conveyor path (40), between the sharpening stage (23) and the collecting receptacle (70), during which unwanted burrs can be removed on another cylinder (60). As a result, already finished pins fall into the receptacle at the end of the conveyor path.

11 Claims, 4 Drawing Sheets

METHOD AND DEVICE FOR PRODUCING PINS, SUCH AS BATTERY TERMINALS

BACKGROUND OF THE INVENTION

1. Field of the Invention

The invention relates first of all to a method for producing pins, for example, battery terminals, as used in electrical batteries as an anode charge eliminator as well as to a device for performing the method.

2. Description of Related Art

The known methods start with a wire which is first cut into sections, then provided with a head, and transported by being freely suspended in a transport rail to a grinding roller for producing a point at the lower end of the pin. The thus formed pin blank is then transported in the transport rail to a receptacle where the thus machined blanks are collected for further processing.

In the known method burrs are formed at the pin end by the grinding process which make an after processing of the blank necessary. When using the pins as directed in a battery, the burrs at the point of the pin end cause the formation of gas bubbles in the anode substance which causes disturbances. Such burrs also soil the apparatus for processing the pins and also present problems in regard to automatic feeding of the pins.

In the known method the pin blanks are subjected to a further special treatment in order to remove the burrs at the point of the pin. The pin blanks are filled into vibratory grinding devices where they are machined together with chemicals and grinding agents. This requires time-consuming further machining steps and also machines that take up a lot of space thereby making the manufacture of battery terminals more expensive. Furthermore, the after treatment in the vibratory grinding device can result in an undesirable after treatment and wear at the remaining surface areas of the pin because of the grinding agents.

In a method for smoothing an annealed tube, which is to be used as a solid electrolyte in sodium sulfur cells (PATENT ABSTPACTS OF JAPAN, vol. 017, no. 106 M-1375), identical surface areas of the tube, on the one hand, at the end and, on the other hand, on the shaft, are respectively individually treated by two combination rollers. The combination rollers comprise at the same time grinding agents as well as rotating brush means. The rotation axes of the combined rollers extend parallel to the longitudinal axis of the tubes. In both processing steps the axis symmetry and the angle of attack of the grinding and brush means are identical. The piece-by-piece treatment of the tubes by the combination roller is cumbersome and time-consuming. The tubes have no heads so that transport rails cannot be used. Also, at the opposite end of the tubes there are no points to be ground so that a deburring of points is of no concern.

In another method for forming points at rod-shaped objects (DE 41 07 871 A1), a receiving device is used for these rod-shaped objects. The receiving device has an exit opening which is arranged at an acute angle to the end face of the grinding wheel. The removal of burrs is not addressed. The circumferential area of the grinding wheel is not used when treating the rod-shaped objects.

For polishing needle eyes (DE 36 324) the needles are guided between a slowly rotating disk and a hollowed table. A quickly rotating hollowed steel wire brush rounds off the eye and polishes it. The manufacture of the needle points is carried out independently in a separate device. The treatment of the needle point is not suggested in this device.

SUMMARY OF THE INVENTION

The invention has first of all the object to develop a reliable method of the kind pursuant to the preamble of claim 1 for producing battery terminals, which method produces battery terminals in a faster and cost-saving manner. This is inventively achieved by the features of the characterizing portion of claim 1 having the following special meaning.

According to the invention, a plurality of rotating pins are simultaneously positioned within different processing stages which are taking place in two sequentially arranged but separate sections of the transport rail. The grinding roller for forming the points of the pin blanks is arranged in the first rail section, while an auxiliary individual roller for deburring the pin points is employed in the second rail section. The pins are positioned within these rail sections and are, depending on their respective position in their individual processing stages. At the beginning section the pins are still blanks or intermediate products while toward the final section they are increasingly nearing completion. At the end of the rail the finish-machined pin end products fall into a common receptacle where they are collected for further processing. Moreover, in both rail sections the engagement angle of the rollers at the pin ends is different. This angle is greater at the roller for deburring that is machining the incoming intermediate pin products within the second rail section than the corresponding angle of the grinding roller relative to the blanks within the first rail section.

It was found to be beneficial to use a grinding disc as an auxiliary roller in the second rail section. It is also possible, as shown in the disclosed embodiment, to employ the brush roller for the after treatment of the pin points. The invention thus eliminates the conventional separate deburring process for battery terminals. The available guiding of the pin blanks is used according to the invention simultaneously to finish the battery terminals in groups. Because the grinding of the pin points, on the one hand, and the deburring of the finished points, on the other hand, are performed simultaneously but separately in groups in neighboring rail sections on sequentially arranged pins, a considerable time saving is realized.

The invention is directed also to a device for performing the method according to claim 1. In the invention a device for grinding the pin points can take over the new function, mentioned already several times, of deburring the finished pin points. An extension of the transport rail is of no concern when the rail sections are positioned vertically staggered and the pins are guided in opposite directions in these sections in a switchback fashion. Accordingly, the device can be designed to have a size that is space-conserving.

BRIEF DESCRIPTION OF THE DRAWINGS

Further measures and advantages of the invention result from the dependent claims, the following description, and the drawings. It is shown in:

DESCRIPTION OF PREFERRED EMBODIMENTS

Figure 1:
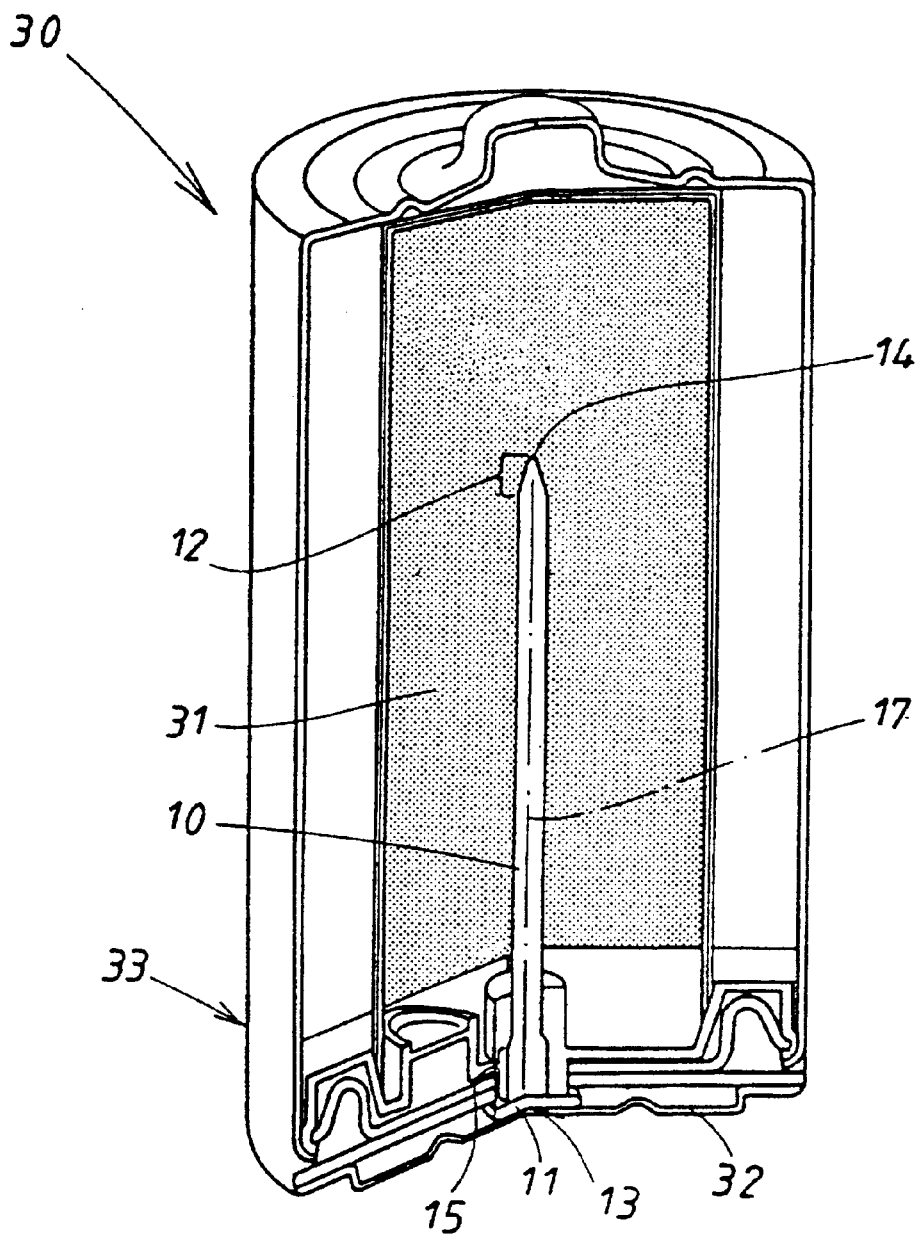
FIG. 1 an electrical battery, shown in longitudinal section and perspectively, which illustrates the use of the inventive battery terminals as directed.

The application situation shown in FIG. 1 shows the finished pin product 10 in its directed use as a battery terminal in an electrical battery 30. The battery terminal 10 comprises a wide head 11 at one of its pin ends 13 and a point 12 having flattened portion 16, best illustrated in FIG. 7, at the opposite, other pin end 14. In some applications, one of which is illustrated in FIG. 1, the battery terminal 10, can also have a thickened shaft portion 15 in the area of the head 11, which however may be missing in other cases.

As can be seen in FIG. 1, the battery terminal 10 is positioned with a pin axis 17 indicated by a dashed line in the center of the electrical battery 30 and is immersed thereby in the electrolyte 31. The terminal 10 acts as an anode charge eliminator whereby the negative battery pole is provided by its head 11. The wide head 11 when mounted provides a good electrical contact with the bottom plate 32 of the cup 33 which serves as a component of the battery housing.

Figure 2:
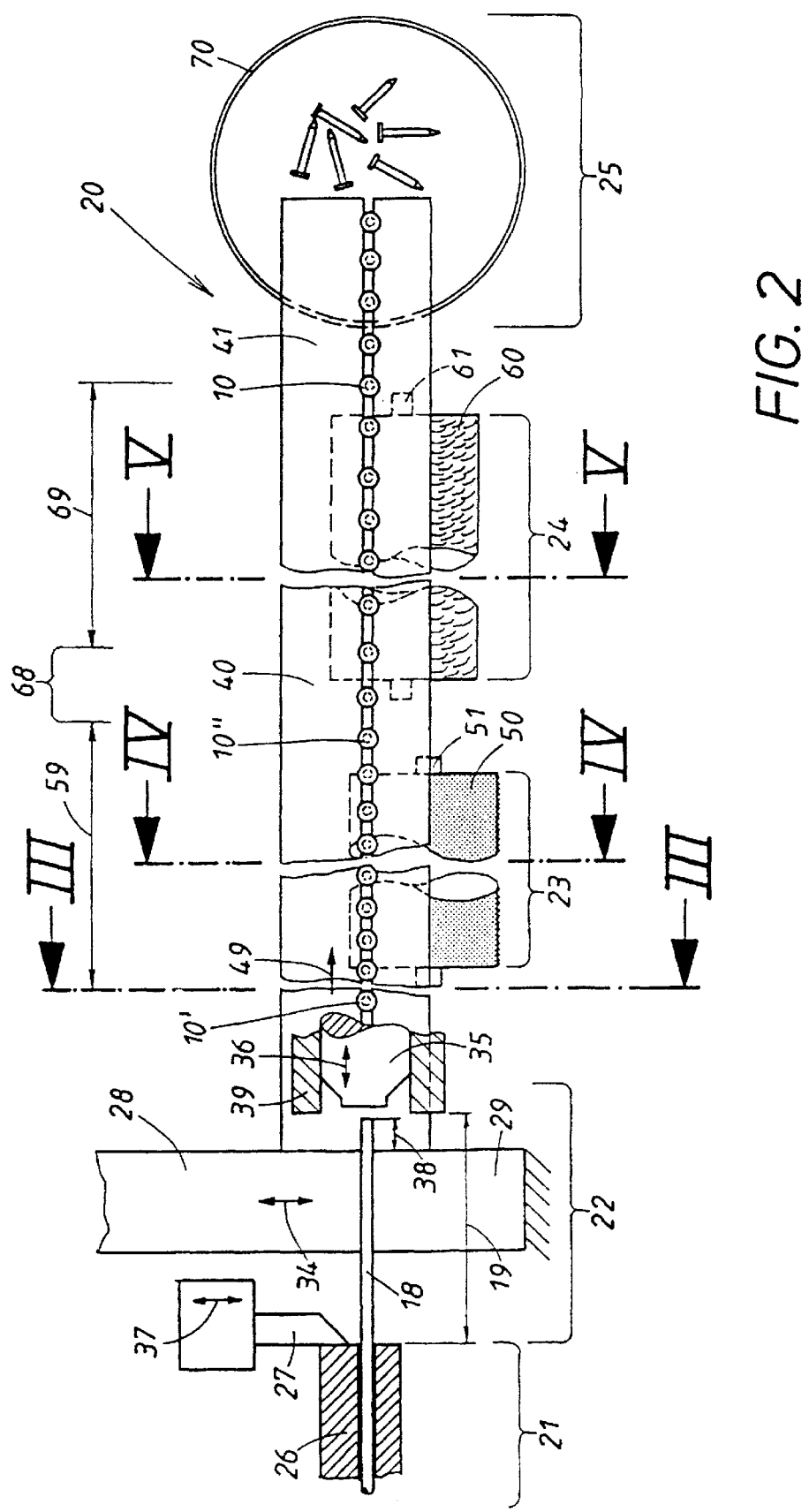
FIG. 2 schematically, in a plan view and in a partially cut-away view, a plan view onto the inventive device in which the inventive method steps are carried out in a stepwise manner.

FIG. 2 illustrates the inventive method in sequential method steps in connection with the device 20 used with the inventive method. The method steps are identified in FIG. 2 by numerals 21 through 25, where the following is happening.

In a first method step 21 a continuous metal wire 18 is fed into the device and is guided through a guide 26 to a cutting tool 27 which in the following method step 22 allows the production of wire sections 19 of a defined length. Here two matrices 28, 29 engaging the wire sections 19 are provided, wherein at least one matrix 28 is movable in the direction of the double arrow 34. The two matrices 28, 29 engage the wire 18 between them, wherein a certain wire end piece 38 projects past the matrices 28, 29. The matrices 28, 29 fixedly hold the wire 18, and in correlation therewith, the cutting tool 27 performs a cutting movement, illustrated by double arrow 37 in FIG. 2, at the end face of the guide 26. This produces a separated wire section 19.

In the second method step 22 the previously mentioned pin head 11 is produced. For this purpose, a riveting die 35 represented in FIG. 2 and movable axially in the direction of double arrow 36 is provided. The riveting die 35 works within a guide 39 and deforms the wire end piece 38 which projects past the matrices 28, 29 so as to shape the head 11 illustrated in FIG. 1. This results in a pin blank 10' whose appearance can be seen in FIG. 3.

In a plane below the parts of the device 20 performing the second method step 22, a transport rail 40 is positioned which has a longitudinal rail slot 41. The pin blanks 10' fall into this slot 41 when the two matrices 28, 29 open. They get caught in the slot with their pin heads 11 and project with their shafts freely downwardly. An undesirable pendulum motion transverse to the longitudinal slot extension is prevented by lateral guides 42, 42a, 43 according to FIG. 3 which can engage different areas of the shaft. The transport 49 within the rail 40 could be realized by a slight incline and the use of gravity. However, a transfer lever 44 is primarily used which performs longitudinal and transverse movements 46, 46'; 45, 45' that can be separated into two phases. These movements not only serve to provide a step-wise transport 49 of the pin blanks 10' but also to rotate the pin blank 10' in the direction of the rotation arrow 47 indicated in FIG. 3. This rotation 47 is primarily important for the two further method steps 23, 24 of FIG. 2.

Figure 3:
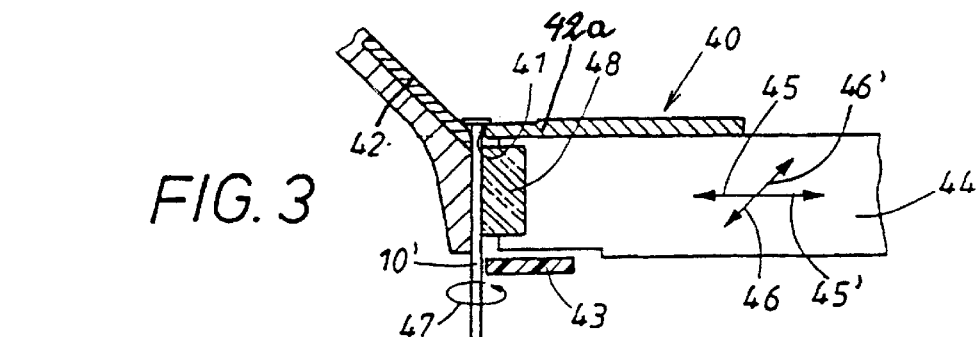
FIGS. 3 through 5 schematically a sectional view of the device of FIG. 2 along the shown section line III—III and IV—IV and V—V, respectively.

The transfer lever 44 is embodied as a longitudinal strip which extends parallel to the longitudinal rail slot 41 and has an elastic rubber insert 48 or something similar at the side facing the pin blanks 10'. The first movement step, according to arrow 45, is substantially a transverse approach movement wherein the rubber insert 48 is moved against the shafts of the pins 10' which cannot yield because of the oppositely arranged guide 42 acting as an abutment. The longitudinal movement of the lever 44 then follows, as illustrated by the arrow 46 in FIG. 3, in the desired transport direction of the rail 40. Subsequently, the engaged pins 10 are entrained and transported within the longitudinal rail slot in the direction of arrow 49 of FIG. 2 within the longitudinal slot 41. This transport movement 49 causes the pins to roll along the counter abutment in the form of the guide 42 so that the aforementioned rotational movement 47 of the pins 10' results. After a certain transport path in the longitudinal direction 46 the transverse counter movement of the lever 44 in the return direction follows, which is illustrated in FIG. 3 by the arrow 45'. Accordingly, the pins 10' are released and the lever 44 performs a longitudinal return movement in a direction counter to the transport direction, indicated by arrow 46' in FIG. 3. This return movement 46' is terminated when the starting position of the transfer lever 44 has been reached where again the aforementioned transverse movement 45 in an approach direction begins. The other guide 43 below the lever 44 is a plastic or metal strip which also provides a support action for the pins during machining in the method steps 23, 24.

Figure 4:
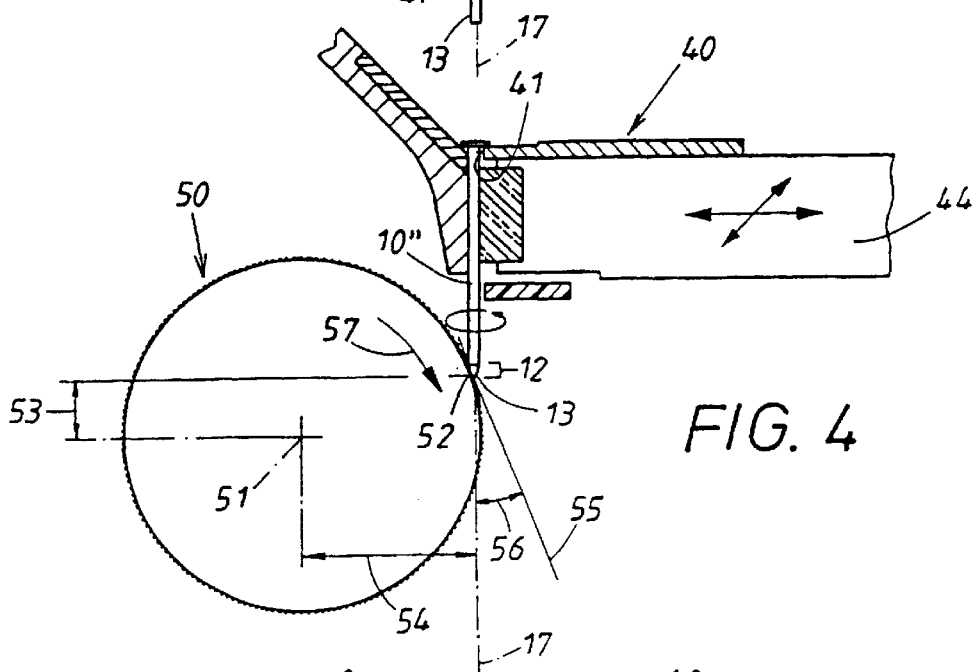
Figure 6:
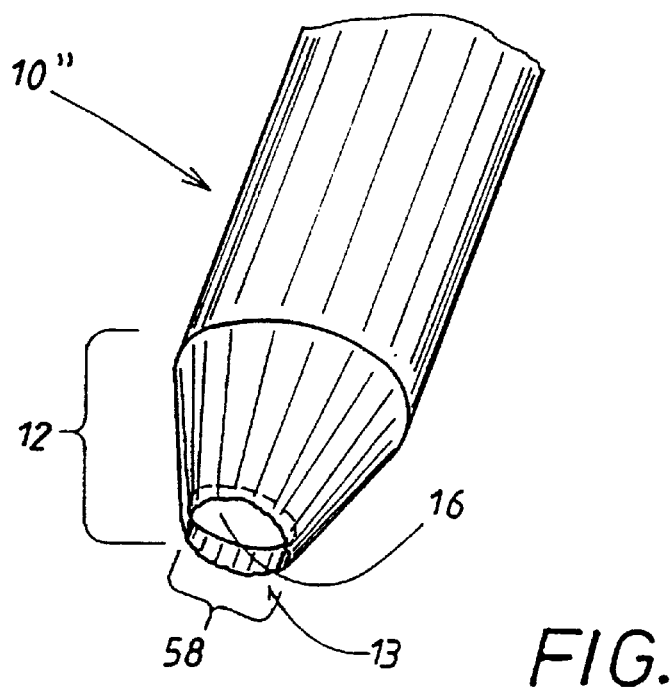
FIG. 6 in a perspective view and enlarged the lower end of the blank after the grinding process.

This transport rail 40 and the correlated aforementioned transport means are also active in the portions downstream where a grinding roller 50 is positioned which is active in the third method step 23 of FIG. 2. The grinding roller 50 is arranged on a side opposite the lever 44 and extends with its preferably adjustable rotational axis 51 approximately parallel to the longitudinal rail slot 41. The rotational direction 57 of the grinding roller 50 is illustrated in FIG. 4 by an arrow. Grinding occurs at the lower end 13 of the pin so that the pin point 12 is formed which has already been indicated in FIG. 4. An intermediate pin product 10" with a pin point 12 having a configuration as illustrated in FIG. 6 is obtained. Burrs 58 project past the central flattened portion 16 at the lower end 13 of the pin, and these burrs must be removed for the reasons mentioned above. This is carried out in the same device 20 and in the same process during the fourth method step 24 of FIG. 2.

Figure 7:
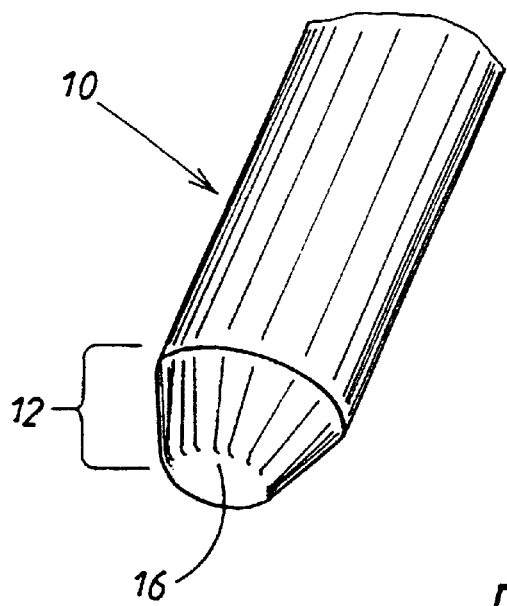
FIG. 7 the pin point of the finished and deburred pin product in a perspective, enlarged representation analog to FIG. 6.

The fourth method step 24 is carried out in a rail section 69 downstream of the section 59 of FIG. 2 in which the grinding process was performed. These two sections 59, 68 are expediently staggered vertically and the pins 10' or 10" pass through the sections in opposite direction. At the rail transition 68 a deflection of the guiding action acting on the pins takes place. Within the transitional area of 68 the pins are already transported as intermediate pin products 10" provided with points 12. In the section 69 a brush roller 60 is provided having bristles preferably in the form of plastic grinding bristles. Grinding particles, such as silicon carbide, are integrated into these plastic grinding bristles. The brush roller 60 ensures that the burrs 58 according to FIG. 6 are removed from the intermediate pin products 10" and that the pin end product 10 shown in FIG. 7 is produced. As can be seen in FIG. 7, the burrs 58 are no longer present in the end product 10. A smooth and optionally somewhat rounded transition between the cone of the point and the central flattened portion 16 of the battery terminal 10 is present.

Figure 5:
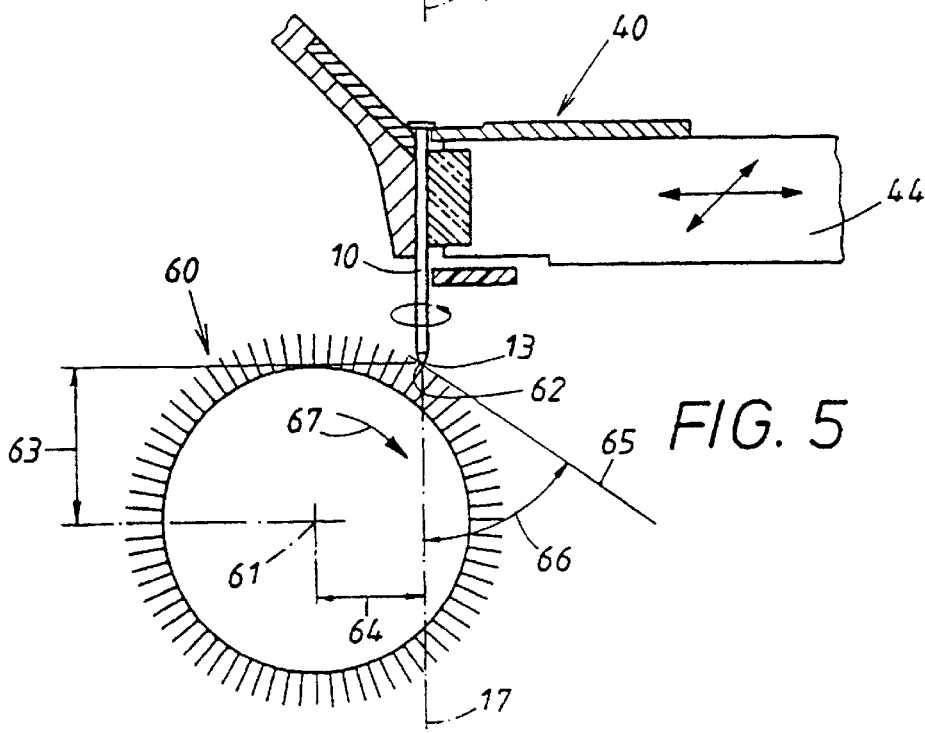

In FIGS. 4 and 5 the special positions of the grinding roller 50, on the one hand, and of the brush roller 60, on the other hand, relative to the machining locations, indicated with reference numerals 52 and 62, on the lower ends 13 of the pins of the intermediate products 10" or end products 10 can be seen. The rotational axis 51 of the grinding roller 50 is arranged at a smaller vertical spacing 53 from the lower end 13 of the pin than the rotational axis 61 of the brush roller 60 which is also preferably adjustable. The brush roller has a greater vertical spacing 63 as can be seen in FIG. 5. For a substantially identical diameter of the rollers 50, 60, the respective horizontal spacings 54, 64 of the lower ends 13 of the pins to the roller center have a reciprocal ratio to the vertical spacings 53, 63.

In FIGS. 4 and 5 the contact tangents 55, 65 resulting at the respective machining locations 52,62 are illustrated at the respective machining locations 52,62. They form different contact angles 56, 66 relative to the respective pin axis 17. The contact angle 66 of the brush roller 60 is greater than the contact angle 56 of the grinding roller 50.

As can be seen by the rotation arrow 67 in FIG. 5, the brush roller rotates in the same direction as the grinding roller 50. Accordingly, identical drive means can be used for both of them. The same holds true for the drive of the respective transfer levers 44 in the different sections of the transport rail 40.

As can be seen in FIG. 2, already finished pin end products 10 leave the fourth method step 24 and are then conveyed on the transport rail 40 to a receptacle 70. The already finished pins 10 are collected here and are available for further processing or assembling, for example, in a battery 30. In this fifth working step 25 a collection, optionally also a quantity-based separation, of the finished pins 10 is carried out.

As already mentioned above, instead of the disclosed brush roller 60 it is also possible to employ a further grinding roller for deburring the pin points. The arrangement however should be as shown in the drawings and as disclosed above. This embodiment has been very successful in practice.

What is claimed is:

1. A method for producing pins, the method comprising the steps of:
   continuously guiding a wire to a cutting tool and cutting the wire to wire sections of a defined length;
   subsequently, supplying the wire sections sequentially to a swage and providing a first section end of the wire sections with a pin head to thereby produce a pin blank, respectively;
   subsequently, placing the pin blanks into a transport rail where the pin blanks are freely suspended in a longitudinal rail slot of the transport rail by the pin heads;
   subsequently, conveying the pin blanks through sequentially arranged sections of the transport rail and simultaneously machining the pin blanks in groups;
   in a first one of the sequentially arranged sections of the transport rail, passing a second section end of the wire sections facing away from the pin head along a grinding roller, thereby rotating the pin blanks about a vertical pin axis and producing a pin point with burrs on the pin blank;
   subsequently, transporting the pin blanks with the pin point to a second one of the sequentially arranged sections of the transport rail as an intermediate pin product provided with a pin point;
   moving the intermediate pin products in the second one of the sequentially arranged sections of the transport rail along an auxiliary roller and removing the burrs present at the pin points, wherein a contact angle of the auxiliary roller to the pin point of the intermediate product is greater in comparison to a corresponding contact angle of the grinding roller at the pin point of the pin blanks;
   subsequently, conveying the pin blanks with the pin point already deburred in the transport rail to a receptacle where they fall out of the longitudinal rail slot and are collected.

2. The method according to claim 1, wherein the auxiliary roller is a brush roller or an additional grinding roller.

3. The method according to claim 1, wherein the pins are battery terminals used as anode charge eliminators in electrical batteries.

4. A device for performing the method of claim 1, the device comprising:
   a cutting tool configured to cut wire to wire sections of a defined length;
   a swage configured to produce a pin blank by swaging a first section end of the wire sections to a pin head;
   a transport rail having first and second sequentially arranged sections configured to transport the pin blanks by being freely suspended from the pin heads in a longitudinal rail slot, wherein the first and second sequentially arranged sections of the transport rail are arranged vertically staggered relative to one another and the pins are transported therethrough in opposite directions to one another;
   a grinding roller correlated with the first sequentially arranged section of the transport rail configured to grind a second section end facing away from the pin head and produce a pin point with burrs on the pin blank;
   an auxiliary roller correlated with the second sequentially arranged section of the transport rail configured to remove the burrs present at the pin points, wherein a contact angle of the auxiliary roller relative to the pin point of the intermediate product is greater in comparison to a corresponding contact angle of the grinding roller at the pin point of the pin blanks;
   a receptacle arranged at the end of the transport rail and configured to collect the pins.

5. The device according to claim 4, wherein the auxiliary roller is a brush roller having plastic grinding bristles in which grinding particles such as silicon carbide are integrated.

6. The device according to claim 4, wherein the grinding roller and the auxiliary roller have substantially matched roller diameters, wherein a rotational axis of the auxiliary roller is arranged at a smaller horizontal spacing to the vertical pin axis than a rotational axis of the grinding roller.

7. The device according to claim 4, wherein the grinding roller and the auxiliary roller have substantially matched roller diameters, wherein a rotational axis of the auxiliary roller is positioned relative to the second section end opposite the pin head at a greater vertical spacing than the rotational axis of the grinding roller.

8. The device according to claim 4, further comprising transfer levers arranged opposite the grinding roller and the auxiliary roller, respectively; wherein the transfer levers are alternating moved in two phases; wherein in a first phase the transfer levers are moved transversely to a transport direction of the pins against the grinding roller and the auxiliary roller, respectively, and then parallel to the transport direction of the pins along the transport rail, wherein the second section ends are pressed against the grinding roller and the auxiliary roller, respectively, and are transported in the transport direction and rotated; and wherein, in a second phase, the transfer levers are moved transversely to the transport direction away from the grinding roller and the auxiliary roller, receptively, and then parallel to the transport rail in a direction counter to the transport direction of the pins, and the pins are released.

9. The device according to claim 8, wherein the grinding roller and the auxiliary roller are moved in rotation by a common drive.

10. The device according to claim 8, wherein the transfer levers are independently but commonly moved by a common drive.

11. The device according to claim 4, wherein the pins are battery terminals used as anode charge eliminators in electrical batteries.

* * * * *

UNITED STATES PATENT AND TRADEMARK OFFICE
CERTIFICATE OF CORRECTION

PATENT NO. : 6,364,753 B1  
DATED : April 2, 2002  
INVENTOR(S) : Manfred Gehring et al.

It is certified that error appears in the above-identified patent and that said Letters Patent is hereby corrected as shown below:

<u>Title page,</u>  
Item [30], should read: -- [30]  Foreign Application Priority Data  
Aug. 14, 1997   Germany…………..197 35 299 --

Signed and Sealed this

Third Day of December, 2002

JAMES E. ROGAN  
*Director of the United States Patent and Trademark Office*